United States Patent
Li et al.

(10) Patent No.: US 10,631,142 B2
(45) Date of Patent: Apr. 21, 2020

(54) SYSTEMS, METHODS, AND DEVICES FOR EXTENDING RANGE OF WIRELESS NETWORKS

(71) Applicant: Intel IP Corporation, Santa Clara, CA (US)

(72) Inventors: Qinghua Li, San Ramon, CA (US); Huaning Niu, San Jose, CA (US); Yuan Zhu, Beijing (CN); Hwan-Joon Kwon, Santa Clara, CA (US); Jeongho Jeon, San Jose, CA (US); Xiaogang Chen, Portland, OR (US); Yang Tang, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 74 days.

(21) Appl. No.: 15/876,777

(22) Filed: Jan. 22, 2018

(65) Prior Publication Data

US 2018/0249303 A1 Aug. 30, 2018

Related U.S. Application Data

(63) Continuation of application No. 14/579,778, filed on Dec. 22, 2014, now Pat. No. 9,877,174.
(Continued)

(51) Int. Cl.
*H04L 5/00* (2006.01)
*H04L 27/26* (2006.01)
(Continued)

(52) U.S. Cl.
CPC ............ *H04W 4/18* (2013.01); *H04L 1/0059* (2013.01); *H04L 1/0079* (2013.01);
(Continued)

(58) Field of Classification Search
CPC ... H04L 1/0059; H04L 1/0071; H04L 1/0079; H04L 1/0088; H04L 1/08; H04L 5/0007;
(Continued)

(56) References Cited

U.S. PATENT DOCUMENTS 7,804,912 B2 9/2010 Luz et al.
7,899,125 B2 3/2011 Maltsev et al.
(Continued)

FOREIGN PATENT DOCUMENTS

EP 1502439 B1 6/2007
WO 1990/006647 A1 6/1990
(Continued)

OTHER PUBLICATIONS

International Search Report and Written Opinion received in PCT Application No. PCT/US2015/052237, dated Feb. 17, 2016, 12 pages.
(Continued)

*Primary Examiner* — Alpus Hsu
(74) *Attorney, Agent, or Firm* — Eversheds Sutherland (US) LLP (57) ABSTRACT

Example systems, methods, and devices for extending range of WiFi networks are discussed. More specifically, methods for extending range of a Wi-Fi network are disclosed. For example, a device may determine a first HE signal field of one or more HE signal fields of a frame associated with one or more first station devices (STAs). The device may segment the first HE signal field into a common part and one or more user specific parts. The device may encode a first user specific part of the one or more user specific parts individually into one or more first symbols. The device may encode a second user specific part of the one or more user specific parts individually into one or more second symbols. The device may cause to send the one or more first symbols
(Continued)

associated with the encoded first user specific part and the one or more second symbols associated with the encoded second user specific part to the one or more first STAs using a first subcarrier of one or more subcarriers, wherein the first HE signal field comprises the encoded first user specific part and the encoded second user specific part.

20 Claims, 9 Drawing Sheets

Related U.S. Application Data (60) Provisional application No. 62/064,353, filed on Oct. 15, 2014.

(51) Int. Cl.
  *H04L 29/06* (2006.01)
  *H04W 4/18* (2009.01)
  *H04L 1/00* (2006.01)
  *H04L 1/08* (2006.01)
  *H04W 84/12* (2009.01)

(52) U.S. Cl.
  CPC .............. *H04L 1/0088* (2013.01); *H04L 1/08* (2013.01); *H04L 5/0007* (2013.01); *H04L 27/2602* (2013.01); *H04L 27/2613* (2013.01); *H04L 27/2647* (2013.01); *H04L 69/18* (2013.01); *H04L 69/22* (2013.01); *H04L 1/0071* (2013.01); *H04W 84/12* (2013.01)

(58) Field of Classification Search
  CPC ............. H04L 27/2602; H04L 27/2613; H04L 27/2647; H04L 69/18; H04L 69/22; H04W 4/18; H04W 84/12
  See application file for complete search history.

(56) References Cited

U.S. PATENT DOCUMENTS

| | | | |
|---|---|---|---|
| 8,599,804 B2 | 12/2013 | Erceg et al. | |
| 8,614,655 B2 | 12/2013 | Park | |
| 8,619,676 B2 | 12/2013 | Zheng et al. | |
| 8,731,092 B2 | 5/2014 | Sandhu | |
| 8,867,565 B2 | 10/2014 | van Zelst et al. | |
| 9,042,331 B2 | 5/2015 | Lee et al. | |
| 9,107,099 B2 | 8/2015 | Erceg et al. | |
| 9,178,968 B2 | 11/2015 | Porat | |
| 9,203,672 B2 | 12/2015 | Porat | |
| 9,203,673 B2 | 12/2015 | Porat | |
| 9,204,337 B2 | 12/2015 | Fischer et al. | |
| 9,281,928 B2 | 3/2016 | Porat et al. | |
| 9,351,333 B1 | 5/2016 | Zhang et al. | |
| 9,398,571 B2 * | 7/2016 | Kwon | H04W 72/0406 |
| 10,305,647 B2 * | 5/2019 | Seok | H04L 5/003 |
| 2005/0216819 A1 | 9/2005 | Chugg et al. | |
| 2010/0208594 A1 | 8/2010 | Kwon et al. | |
| 2010/0260159 A1 | 10/2010 | Zhang et al. | |
| 2010/0310002 A1 | 12/2010 | Lauer et al. | |
| 2012/0275539 A1 | 11/2012 | Maltsev et al. | |
| 2012/0294294 A1 | 11/2012 | Zhang | |
| 2013/0107912 A1 | 5/2013 | Ponnampalam | |
| 2015/0117227 A1 | 4/2015 | Zhang et al. | |
| 2015/0163028 A1 * | 6/2015 | Tandra | H04L 5/0037 370/203 |
| 2017/0214561 A1 * | 7/2017 | Lee | H04L 1/00 |

FOREIGN PATENT DOCUMENTS

| | | |
|---|---|---|
| WO | 2007/120331 A2 | 10/2007 |
| WO | 2010/120692 A1 | 10/2010 |

OTHER PUBLICATIONS

Search Report for Taiwanese Application No. 104129160, dated Feb. 20, 2017, 2 pages (1 page English translation).
Office Action issued in Taiwanese Application No. 104129160, dated Jul. 26, 2016 (10 pgs., including 1 pg. translation).
European Search Report received in European Patent Application No. 18187593.1, dated Nov. 1, 2018, 11 pgs.
Joonsuk Kim (Broadcom): "Bit-Consideration-for-SIG-fields; 11-10-0382-00-00ac-bit-consideration-for-sig-fields", IEEE Draft; 11-10-0382-00-00ac-bit-consideration-for-SIG-fields, IEEE-SA Mentor,Piscataway, NJ, USA, vol. 802.IIac, Mar. 17, 2010 (Mar. 17, 2010), pp. 1-12, XP017677237, [retrieved on Mar. 17, 2010]*Slides 2-7*.
Ron Porat Et Al.: "Sig-B Encoding Structure Part II", IEEE 802.11-15/1059rl, Sep. 14, 2015 (Sep. 14, 2015), pp. 1-15, XP055379943, Retrieved from the Internet: URL:https://mentor.ieee.org/802.11/dcn/15/11-15-1059-01-00ax-sig-b-encoding-structure-part-ii.pptx, [retrieved on Jun. 9, 2017] * Slide 10 *.

* cited by examiner

SYSTEMS, METHODS, AND DEVICES FOR EXTENDING RANGE OF WIRELESS NETWORKS

CROSS REFERENCE TO RELATED APPLICATIONS

This application in a continuation of U.S. patent application Ser. No. 14/579,778 filed Dec. 22, 2014, which claims the benefit of U.S. Provisional Patent Application No. 62/064,353, filed on Oct. 15, 2014, the disclosures of which are incorporated herein by reference.

TECHNICAL FIELD

Embodiments described herein generally relate to wireless networks.

BACKGROUND

A next generation WLAN, IEEE 802.11ax or High-Efficiency WLAN (HEW), is under development. Uplink multiuser MIMO (UL MU-MIMO) and Orthogonal Frequency-Division Multiple Access (OFDMA) are two major features included in the new standard. For both features, however, the physical layer header is an overhead and reducing its size and reliability is an important aspect.

DETAILED DESCRIPTION

Example embodiments described herein provide certain systems, methods, and devices, for extending range of various Wi-Fi networks, including, but not limited to, IEEE 802.11ax.

Outdoor applications are one of four scenarios currently being evaluated in IEEE 802.11ax discussions. Range of a Wi-Fi network may be an important feature in outdoor applications. Simulation results comparing long-term evolution unlicensed spectrum (LTE-U) and WiFi indicate that range of a WiFi signal is shorter than LTE-U operating on the same band. Accordingly, the physical layer header, for example, signal field (SIG) may need to be enhanced such that the header is not a bottleneck for subsequent beamformed data. Various proposals have been presented for the design of physical layer header, e.g., the signal field (SIG). Some proposals in DensiFi use ordinary binary phase-shift keying (BPSK) rate half modulation with a long SIGNAL field, e.g., 200-500 bits over 80 MHz. Their high efficiency (HE) SIGNAL field, however, can be a bottleneck for outdoor applications. The example designs discussed here not only reduce the overhead but also increase the reliability of the SIG.

The embodiments of certain systems, methods, and devices described in the present disclosure can provide techniques that extend the range of the header. The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Details of one or more implementations are set forth in the accompanying drawings and in the description below. Further embodiments, features, and aspects will become apparent from the description, the drawings, and the claims. Embodiments set forth in the claims encompass all available equivalents of those claims.

The terms "communication station", "station", "handheld device", "mobile device", "wireless device" and "user equipment" (UE), as used herein, refer to a wireless communication device such as a cellular telephone, smartphone, tablet, netbook, wireless terminal, laptop computer, a wearable computer device, a femtocell, High Data Rate (HDR) subscriber station, access point, access terminal, or other personal communication system (PCS) device. The device may be either mobile or stationary.

The term "access point" (AP) as used herein may be a fixed station. An access point may also be referred to as an access node, a base station or some other similar terminology known in the art. An access terminal may also be called a mobile station, a user equipment (UE), a wireless communication device or some other similar terminology known in the art. Embodiments disclosed herein generally pertain to wireless networks. Some embodiments c a n relate to wireless networks that operate in accordance with one of the IEEE 802.11 standards including the IEEE 802.11ax standard.

Figure 1:
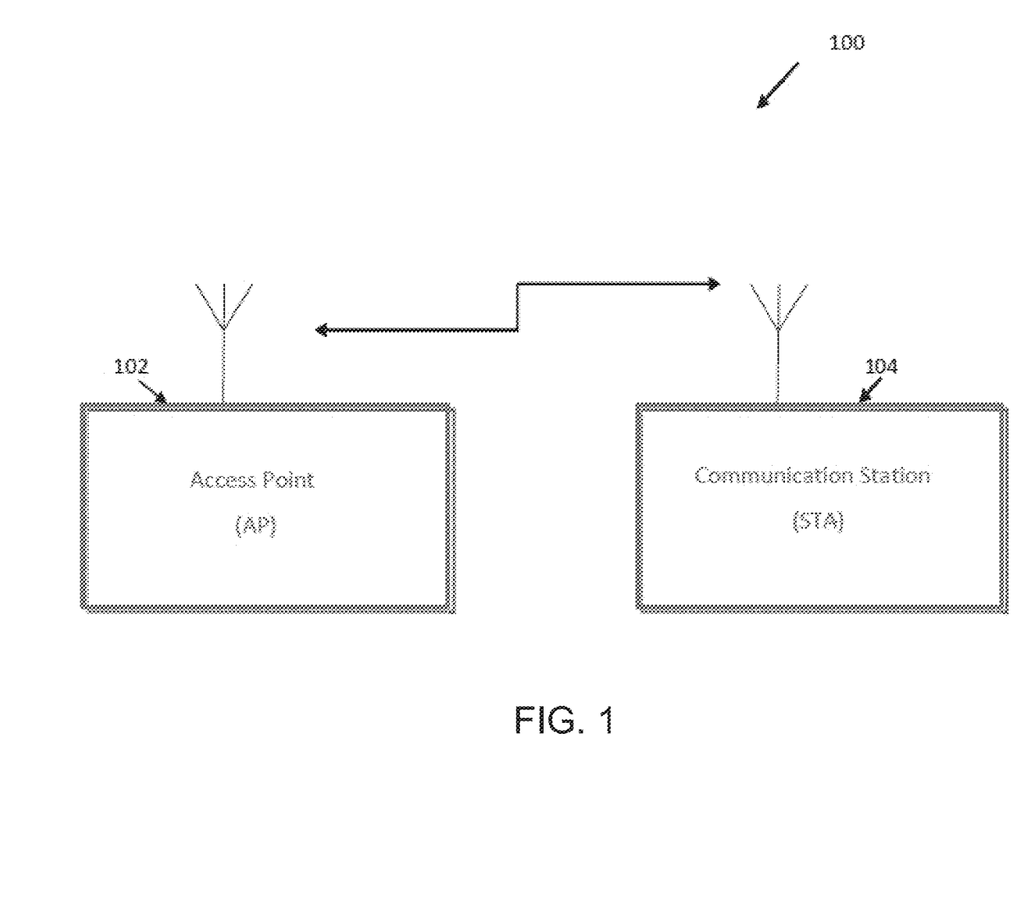
FIG. 1 is a network diagram illustrating an example network environment, according to one or more example embodiments of the disclosure.

FIG. 1 is a network diagram illustrating an example network environment suitable for FTM Burst Management, according to some example embodiments of the present disclosure. Wireless network 100 can include one or more communication stations (STAs) 104 and one or more access points (APs) 102, which may communicate in accordance with IEEE 802.11 communication standards, including IEEE 802.11ax. The communication stations 104 may be mobile devices that are non-stationary and do not have fixed locations. The one or more APs may be stationary and have fixed locations. The stations may include an AP communication station (AP) 102 and one or more responding communication stations STAs 104.

In accordance with some IEEE 802.11ax (High-Efficiency WLAN (HEW)) embodiments, an access point may operate as a master station which may be arranged to contend for a wireless medium (e.g., during a contention period) to receive exclusive control of the medium for an HEW control period (i.e., a transmission opportunity (TXOP)). The master station may transmit an HEW master-sync transmission at the beginning of the HEW control period. During the HEW control period, HEW stations may communicate with the master station in accordance with a non-contention based multiple access technique. This is unlike conventional Wi-Fi communications in which devices communicate in accordance with a contention-based communication technique, rather than a multiple access technique. During the HEW control period, the master station may communicate with HEW stations using one or more HEW frames. Furthermore, during the HEW control period, legacy stations refrain from communicating. In some embodiments, the master-sync transmission may be referred to as an HEW control and schedule transmission.

In some embodiments, the multiple-access technique used during the HEW control period may be a scheduled orthogonal frequency division multiple access (OFDMA) technique, although this is not a requirement. In other embodiments, the multiple access technique may be a time-division multiple access (TDMA) technique or a frequency division multiple access (FDMA) technique. In certain embodiments, the multiple access technique may be a space-division multiple access (SDMA) technique.

The master station may also communicate with legacy stations in accordance with legacy IEEE 802.11 communication techniques. In some embodiments, the master station may also be configurable communicate with HEW stations outside the HEW control period in accordance with legacy IEEE 802.11 communication techniques, although this is not a requirement.

In other embodiments, the links of an HEW frame may be configurable to have the same bandwidth and the bandwidth may be one of 20 MHz, 40 MHz, or 80 MHz contiguous bandwidths or an 80+80 MHz (160 MHz) non-contiguous bandwidth. In certain embodiments, a 320 MHz contiguous bandwidth may be used. In other embodiments, bandwidths of 5 MHz and/or 10 MHz may also be used. In these embodiments, each link of an HEW frame may be configured for transmitting a number of spatial streams.

Figure 2:
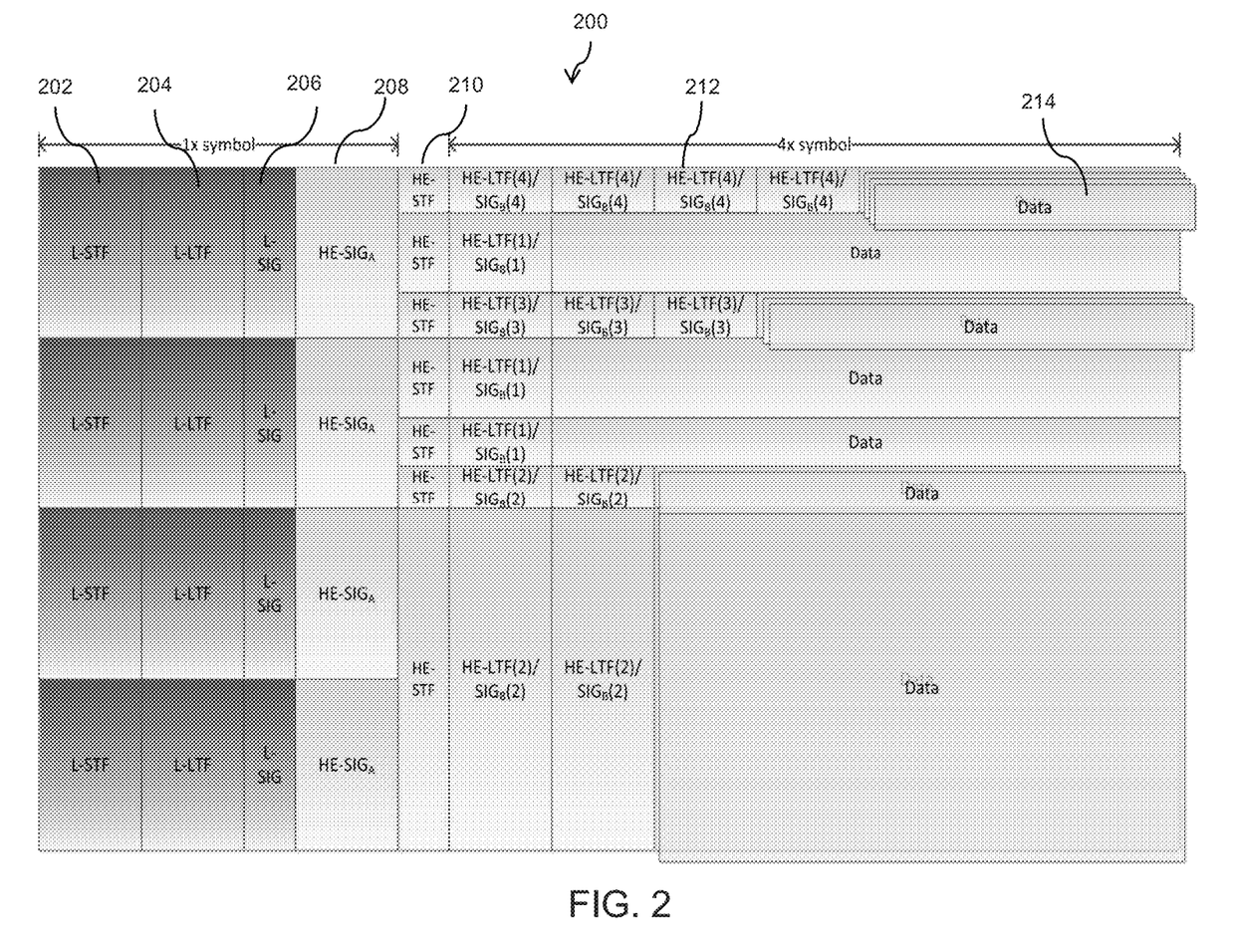
FIG. 2 illustrates resource allocation in a physical layer OFDM frame, according to one or more example embodiments of the disclosure.

In the current DensiFi discussions, various proposals have been presented for the design of physical layer header, for example, the signal field (SIG). A good design would not only reduce the overhead but also increase the reliability of SIG. The indication of the resource allocation is a responsibility of SIG, providing information about the physical signal format for the user to decode and find his/her data. The resources are distributed in frequency and space as illustrated in FIG. 2, for example. The example physical layer frame format of an OFDM signal 200 illustrated in FIG. 2 may include a legacy portion and an 802.11ax portion, for example. The legacy portion may include legacy short training field (L-STF) 202, legacy long training field (L-LTF) 204, and a legacy signal field (L-SIG) 206, for example. The 802.11ax portion may include a high-efficiency signal field (HE-SIGA) 208, a high-efficiency short training field (HE-STF) 210, a high-efficiency long training field (HE-LTF) 212, and a data field 214, for example. The 802.11ax portion may include both broadcast and beamformed parts. HE-SIGA may be the broadcast and the rest, for example, HE-STF, HE-LTF . . . and DATA can be sent with or without beamforming or with or without power boosting, for example. The HE-STF may be used to reset the automatic gain control (AGC) and the HE-LTF may be used to retrain the channel, for example. As illustrated in FIG. 2, the SIG usually spends 20-50 bits per user. Compared with the existing designs in DensiFi, the disclosed systems, methods, and devices have lower overheads.

According to one example embodiment, the signal power may be boosted by repetition. Namely, part of the coded bits or symbols can be sent more than once. For diversity gain, the original codebits or coded symbols and the repeated symbols can be sent on different subcarriers such that they experience different fading channels. As a result, not only the received signal power gets boosted but also the diversity order gets increased.

According to another example embodiment, the long header may be divided into multiple segments (e.g., for different users) and may be protected by individual encoding. Since the reliability of each short segment is higher than the original long header, the short segment has a longer coverage range than the originally joint encoded header. Therefore, the user far away can receive its header info with a higher successful rate.

According to yet another embodiment, the cyclic prefix (CP) of the first and latter SIGNAL field symbols of the high efficiency SIGNAL field (HE-SIG) may be increased such that intersymbol interference due to outdoor large delay spread is reduced without affecting the 11ax auto-detection, for example. For example, the cyclic prefix of the symbols of $HE-SIG_A$ can be longer than the legacy cyclic prefix of about 0.8 micro seconds (µs).

According to yet another embodiment, termination bits may be inserted at the end of each segment of the header. It effectively increases the transmission power for the same payload. For an extreme example, we can send one bit information using convolutional code. The encoder starts from zero state and ends at zero state for sending the single bit information. To end at the zero state, we send 6 tail bits whose codebits are determined by the single payload bit. Therefore, we effectively use 7 input bits to signal a single information bit. This boosts the signal power by multiple times as compared with the normal case with a long stream of payload bits and 6 tail bits at the very end.

According to yet another embodiment, the binary convolutional code (BCC) may be replaced by a more powerful code. For backward compatibility, a concatenated convolutional code may be used. A simple concatenation is the serial concatenation. Namely, the information bit stream can be encoded by the legacy encoder and get the codebits. The codebits may then be interleaved or not interleaved. The codebits may be sent to the legacy encoder again as input bits for another round of encoding. This may be very similar to serial concatenated turbo codes. Since the header bit stream is short, the coding gain may have little improvement. However, an efficient way to reduce the effective code rate may be obtained by doing concatenated encoding such that the header gets a better protection, for example.

According to another embodiment, diversity scheme may be applied to high efficiency SIGNAL field for enhancing its reliability. For example, space-time codes or space-frequency codes or cyclic delay diversity scheme may be applied.

Figure 3:
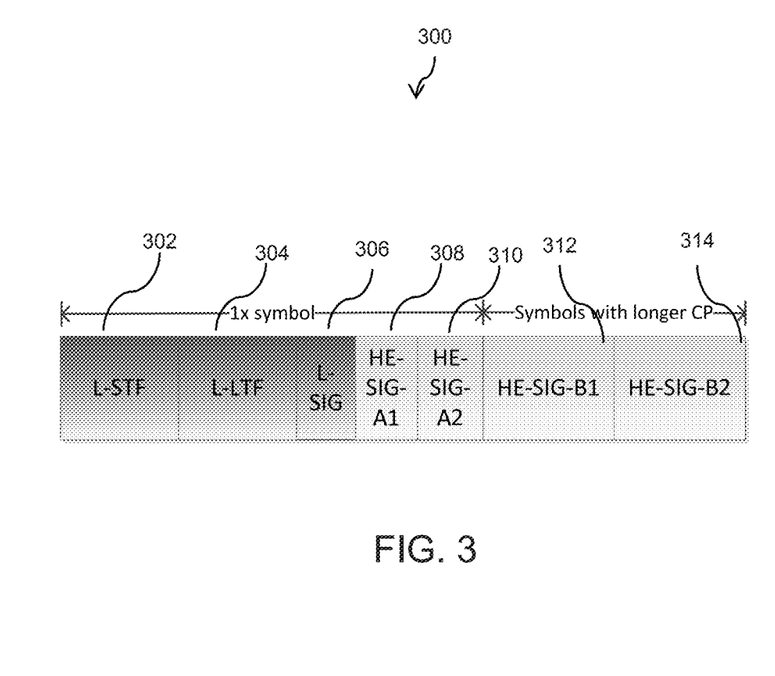
FIG. 3 illustrates preamble structure in a physical layer OFDM frame, according to one or more example embodiments of the disclosure.

Turning now to the figures, FIG. 3 illustrates a preamble structure 300 for a mixed mode, where legacy and IEEE 802.11ax devices may coexist, according to one or more example embodiments of the present disclosure. In FIG. 3, L-STF may denote a legacy short training field 302, L-LTF may denote a legacy long training field 304, L-SIG may denote a legacy SIGNAL field 306, HE-SIG-A1 (or HE-SIG-0-1) may denote a high efficiency SIGNAL field A (or 0) symbol 1 308, HE-SIG-A2 (or HE-SIG-0-2) may denote a high efficiency SIGNAL field A (or 0) symbol 2 310, HE-SIG-B1 (or HE-SIG-1-1) may denote a high efficiency SIGNAL field B (or 1) symbol 1 312, HE-SIG-B2 (or HE-SIG-1-2) may denote a high efficiency SIGNAL field B (or 1) symbol 2 314, for example.

For enabling detection of 11n/11ac/11ax networks, the modulation of HE-SIG-A1 and HE-SIG-A2 may be kept the same as L-SIG which uses ordinary binary phase-shift keying (BPSK) without rotation. In addition, the symbol duration and cyclic prefix (CP) duration may also be the same for L-SIG, HE-SIG-A1, and HE-SIG-A2. HE-SIG-A symbols may be of 20 MHz bandwidth and HE-SIG-B symbols may be 20 MHz or wider, e.g., 80 MHz. It should be noted, however, that legacy devices may treat the preamble as a IEEE 802.11a preamble. The number of HE-SIG-A symbols may be two or more. Similarly, the number of HE-SIG-B symbols may be two or more.

According to one example embodiment, the cyclic prefix (CP) of the third and latter SIGNAL field symbols may be increased such that intersymbol interference due to outdoor large delay spread is reduced without affecting the 11ax auto-detection. In other words, for enhancing the robustness in outdoor channel, the CP length of the OFDM symbols after HE-SIG-A2, e.g., HE-SIG-B1 can be longer than the legacy 0.8 µs. Longer CP may mitigate the intersymbol interference due to long propagation delay in outdoor channels. In addition, for higher spectrum efficiency, a longer symbol duration, e.g., 4× duration may be used. Since multiple 20 MHz subchannels may be used in 80 MHz channel, the symbol boundary of each HE-SIG symbols including HE-SIG-Ai and HE-SIG-Bj may be desired to be aligned for minimizing the inter-subchannel interference. The termination time of the very last HE-SIG symbol may need to be same across all subchannels since high efficiency short training field (HE-STF) may start across the whole band at the same time after the very last HE-SIG symbol.

According to yet another example embodiment, the cyclic prefix duration of the first and/or second symbol after the L-SIG symbol, for example, HE-SIG-A1 and/or HE-SIG-A2 may be longer than the CP of the L-SIG symbol, for example, about 0.8 µs, for reducing the intersymbol interference for outdoor channels. For example the CP of HE-SIG-A1 or HE-SIG-A2 may be about 1.6 µs. For holding the transmission of the legacy 802.11a/n/ac devices, the first or second symbol after the L-SIG symbol, for example, HE-SIG-A1 may only have inphase components without quadrature components, whose constellation may be the same as L-SIG using ordinary binary phase-shift keying (BPSK) without rotation, for example. If there were significant quadrature components in the HE-SIG-A1 symbol, then a legacy device would treat the receiving 802.11ax packet as a 802.11n packet. In this case, since the legacy device would not be able to successfully decode the content after the L-SIG, the legacy device may not be able to hold back its transmission according to the length field in the L-SIG following the receiver procedures in the 802.11n standard. Therefore, the 802.11ax preamble may not look like 802.11n preamble, and the quadrature components in HE-SIG-A1 may be removed. The HE-SIG-A symbols may be of 20 MHz bandwidth and HE-SIG-B symbols may be 20 MHz or wider, e.g., 80 MHz. It should be noted, however, that legacy devices may treat the preamble as a IEEE 802.11a or 802.11ac preamble. This extended CP for the L-SIG may provide a better protection for the decoding of the L-SIG content especially the length field in the L-SIG, which may be reused by 802.11ax.

Figure 4:
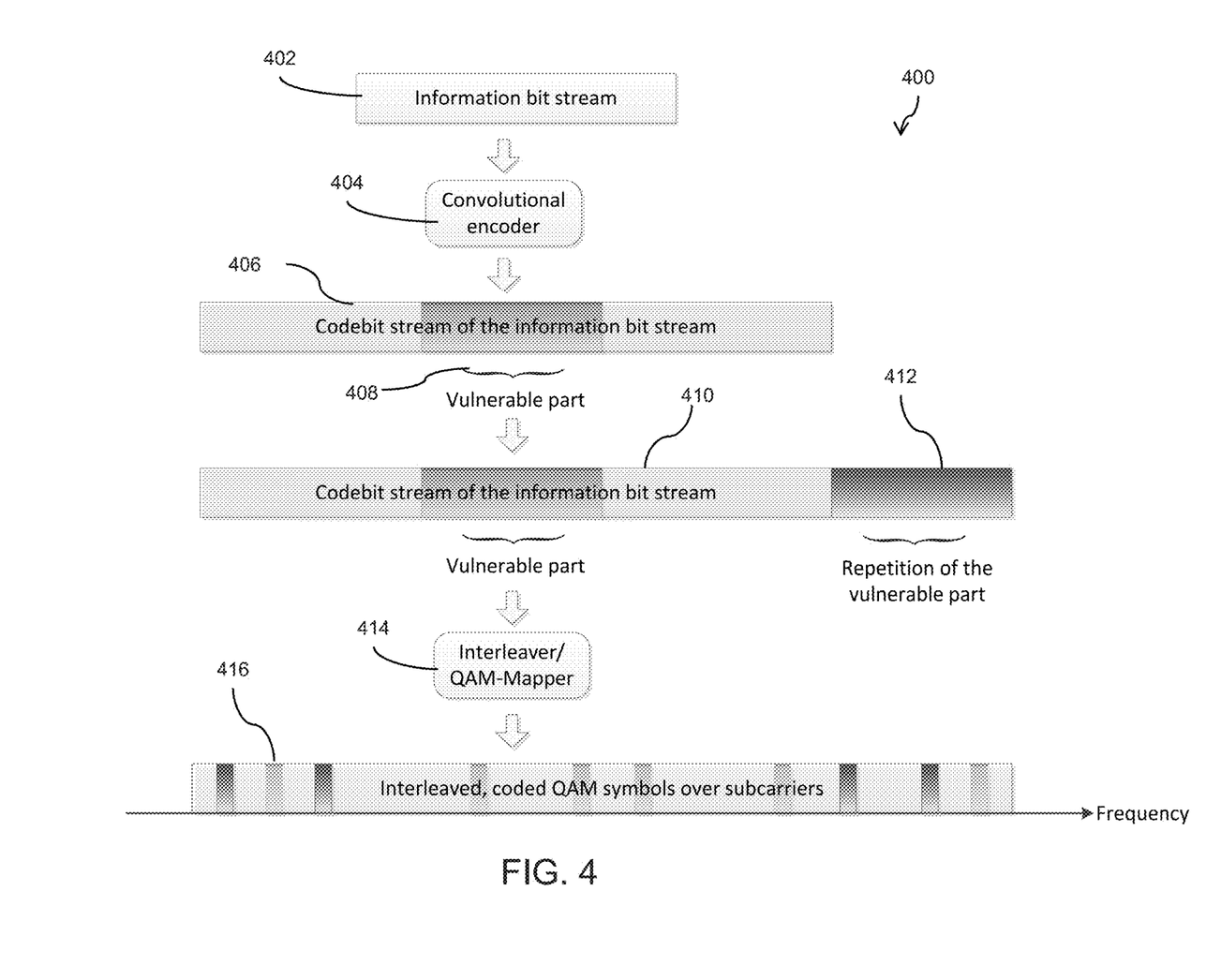
FIG. 4 illustrates a partial repetition of a codebit stream, according to one or more example embodiments of the disclosure.

According to one example embodiment, the signal power may be boosted by repetition. Turning now to FIG. 4, illustrated is a method 400 for extending range of a Wi-Fi signal, according to one or more example embodiments. Information bit stream 402 may be encoded using a convolutional encoder 404, resulting in a codebit stream of the information bit stream 406, for example. A portion 408 of the coded symbols can be sent more than once. For diversity gain, the original symbols 410 and the repeated symbols 412 can be sent on different subcarriers such that they experience different fading channels. As a result, not only the received signal power gets boosted but also the diversity order gets increased. In other words, the repetition can be at two levels. One may be at the codebit level and the other may be at coded symbol level. Part of the codebits 412 can be appended or prefixed to the original codebits 410. The original codebits 410 and the repeated ones 412 may then be sent to an interleaver and a constellation QAM mapper 414 for transmission. For reducing decoding latency, the original codebits 410 and their corresponding repeated bits 412 may be sent within the same OFDM or OFDMA symbol such that the receiver may not need to buffer multiple symbols before starting the decoding, for example.

According to another example embodiment, the repetition may be applied to enhance the reliability of the content in L-SIG, e.g., the length field. It is noted that L-SIG fully occupies one OFDM or OFDMA symbol. All or part of the L-SIG codebits or coded symbols may be sent again in the subsequent OFDM or OFDMA symbol, e.g., HE-SIG-A1, which may have a longer CP than the conventional L-SIG OFDM symbol for better protection against intersymbol interference. In the subsequent OFDM or OFDMA symbol, e.g., HE-SIG-A1, the repeated codebits or coded symbols may be sent on subcarriers other than those in the previous L-SIG symbol for diversity gain. In another example embodiment, in the subsequent OFDM or OFDMA symbol, e.g., HE-SIG-A1, the repeated codebits or coded symbols may be sent on the subcarriers at the same locations as those in the previous L-SIG symbol for the detection of 802.11ax format using auto-correlation. Namely, the 802.11ax receiver may check whether the received signals are repeated on the two OFDM or OFDMA symbols on those subcarriers carrying the repeated codebits or coded symbols. If the received signals are similar enough, e.g., passing a threshold, the receiver may claim that the receiving frame is of 802.11ax format. Enabling such 802.11ax format detection may be at the cost of frequency diversity that requires the repeated signals be sent on a different set of subcarriers.

According to one example embodiment, the repetition can be done at coded symbol level. For example, the codebits may be interleaved and mapped to quadrature amplitude modulation (QAM) symbols first and part of the coded QAM symbols 416 may be sent more than once. It may be desired that the original QAM symbol and its repetition are sent within the same OFDM or OFDMA symbol for reducing decoding latency. For boosting the legacy SIGNAL field, for example, L-SIG in FIG. 3, all or part of the L-SIG coded QAM symbols can be repeated in HE-SIG-A symbols, e.g., HE-SIG-A1 since the L-SIG OFDM symbol has no vacant space or power for the repetition. For example, the QAM (more precisely BPSK) symbols on even subcarriers of L-SIG may be repeated on even subcarriers of L-SIG. Half of the subcarriers in HE-SIG-A1 can be reserved for the repeated symbols. For example, the odd (or even) subcarriers can be reserved for the repetition. For diversity gain, the sequences of the original QAM symbols can be cyclically shifted on the even subcarriers by some number of subcarriers, e.g., 24. For example, the original QAM symbol sequence [d0 d2 d4 . . . d46] may be shifted to [d24 d26 . . . d46 d0 d2 d22]. The shifted sequence of symbols may then be loaded to the odd (or even) subcarriers of HE-SIG-A1 such that the original QAM symbol and its repetition are loaded on two different subcarriers 416, for example. According to another example embodiment, an uneven power loading may be employed across the coded QAM symbols such that the vulnerable part of the codeword, e.g., the middle part of the codeword may get more transmission power.

Figure 5:
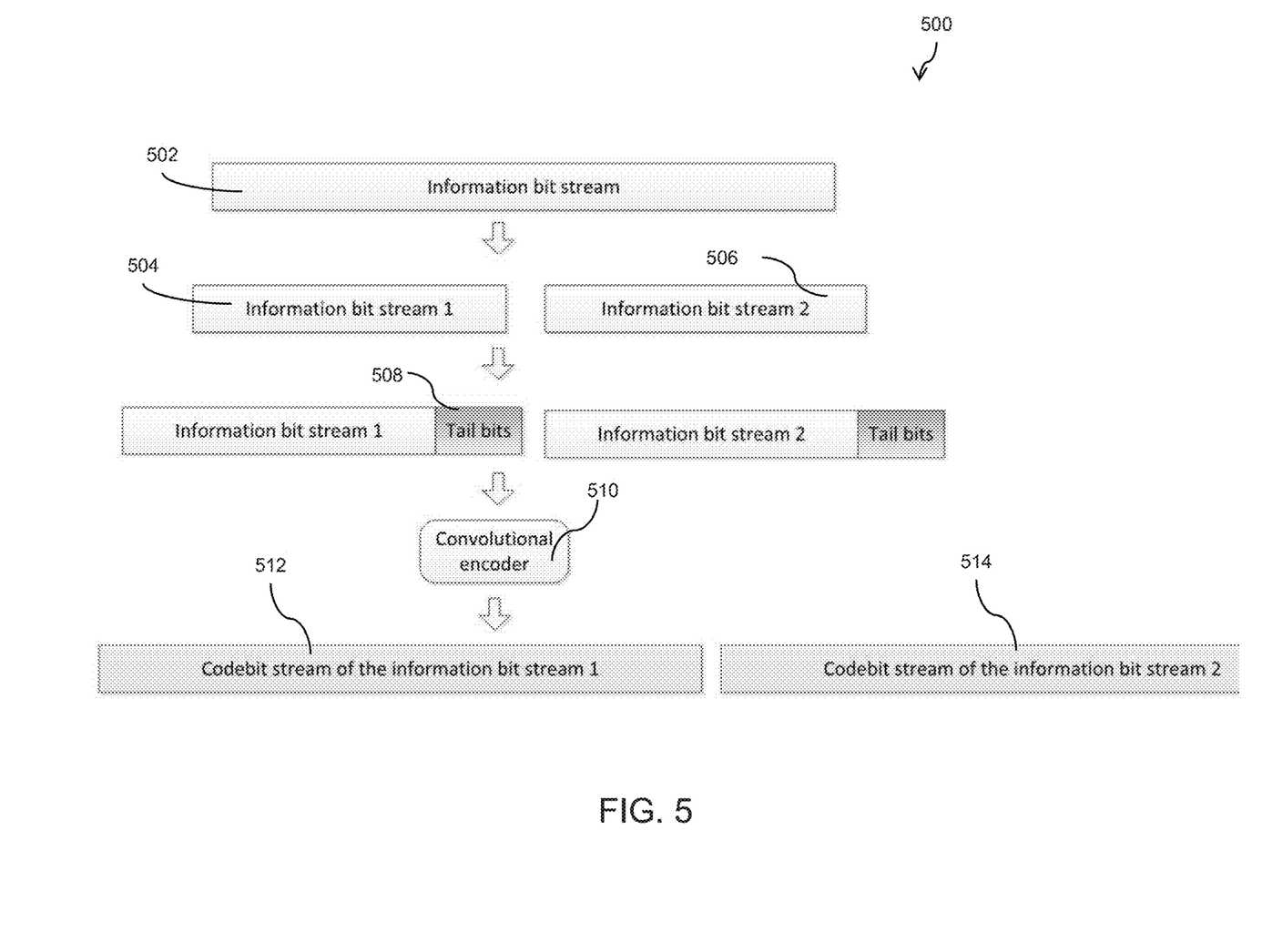
FIG. 5 illustrates fragmentation of a physical layer header and decoding trail bits, according to one or more example embodiments of the disclosure.

Turning now to FIG. 5, illustrated is a method 500 for extending range of a Wi-Fi signal, according to one or more example embodiments. According to this example embodiment, the long header or information bit stream 502 may be divided into multiple segments 504, 506 (e.g., for different users) and protect them by individual encoding. Since the reliability of each short segment is higher than the original long header, the short segment 504, 506 has a longer range than the originally jointly encoded header. Therefore, the user far away can receive its header info with a higher successful rate. Since each user only needs to receive part of the SIGNAL field, which is relevant to the user, the long high efficiency SIGNAL can be fragmented into segments and encoded individually as illustrated. The information bit stream 502 of the SIGNAL field may be partitioned into segments. Each segment may be individually encoded using a convolutional encoder, for example. For example, each segment 504, 506 may be terminated at zero state by appending tail bits 508 at the end as illustrated in FIG. 5, for example. The modified segments including the tail bits 508 can be further encoded using a convolutional encoder 510, for example, resulting in codebit stream of the information bit stream 1 512 and codebit stream of the information bit stream 2 514, for example.

Figure 6:
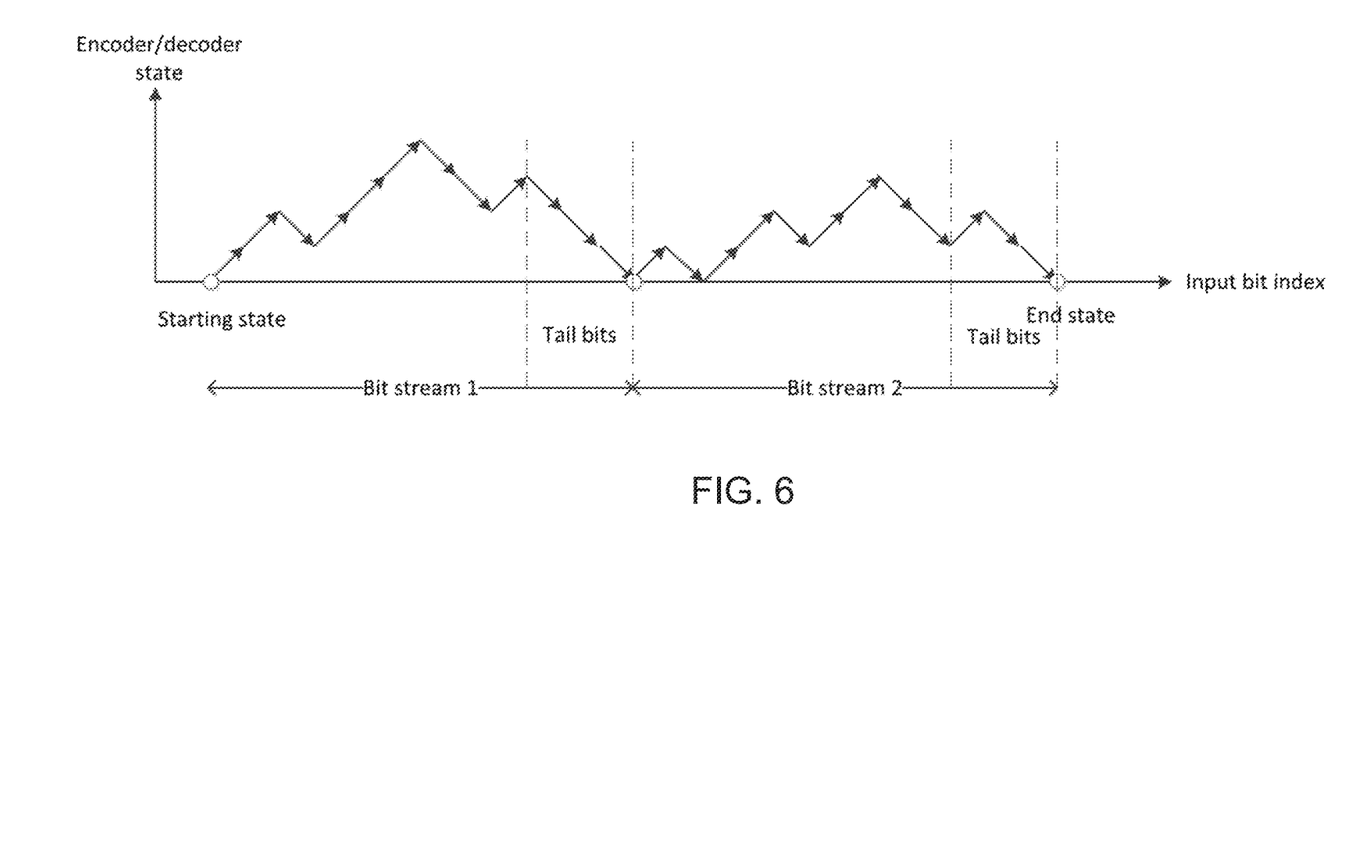
FIG. 6 illustrates fragmentation of a physical layer header and decoding trail bits, according to one or more example embodiments of the disclosure.

According to another example as illustrated in FIG. 6, tail biting convolutional encoding may be used, and tail bits may not be needed in some case. The starting state and the end state of the encoder for the segment may not necessarily be at zero state. However, both of the starting and the end states may be the same. The decoding complexity of tail biting convolutional encoding may be slightly higher than that of the ordinary convolutional decoding. With individual encoding, for example, the receiver can restart the decoding process for each segment of information bits without the error propagating from the decoding of the adjacent segment. Even though some segments may have decoding error, the other segments may still be correctly decoded and be useful. For example, the high-efficiency signal field (e.g., HE-SIG-A) of the header may be partitioned as common information and a set of user specific information. The common information may be needed for all users in the (80 MHz) channel or (20 MHz) subchannel. It may include bandwidth configuration and spatial stream configuration such as band or subband partition and the total number of spatial streams for each subband or subchannel. The user specific information may be needed for each individual user and the user specific information of one or two users may be partitioned into a segment and be encoded individually. The user specific information may include, for example, user ID (association ID (AID) or partial AID), modulation and coding scheme (MCS), spatial stream indexes, channel coding type (e.g., low density parity check (LDPC) or binary convolutional coding (BCC)), diversity scheme type (e.g., space-time block coding (STBC) or cyclic shift diversity (CSD) or cyclic delay diversity (CDD)), beamforming type (e.g., the beamforming indication of the data portion and the feasibility of channel smoothing) for the user, for example.

Figure 7:
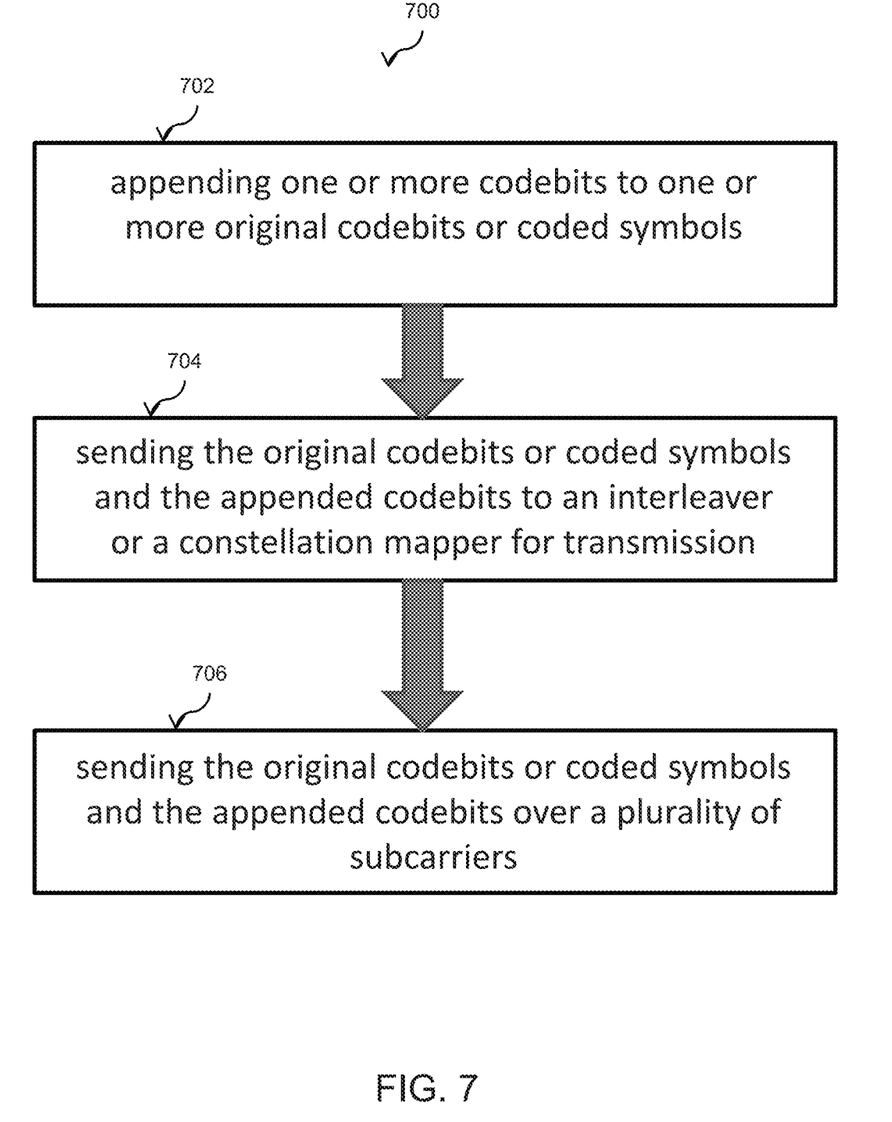
FIG. 7 illustrates example operations in a method for use in systems and devices, according to one or more example embodiments of the disclosure.

FIG. 7, for example, illustrates example operations that may be involved in a method for extending range of a Wi-Fi network, according to one or example embodiments. The method may include the operations of appending, by a network device, one or more codebits or coded symbols to one or more original codebits or coded symbols, sending, by the network device, the original codebits or coded symbols and the appended codebits or coded symbols to an interleaver or a constellation mapper for transmission. The original codebits or coded symbols and the appended codebits or coded symbols may be sent over a plurality of subcarriers, for example.

Figure 8:
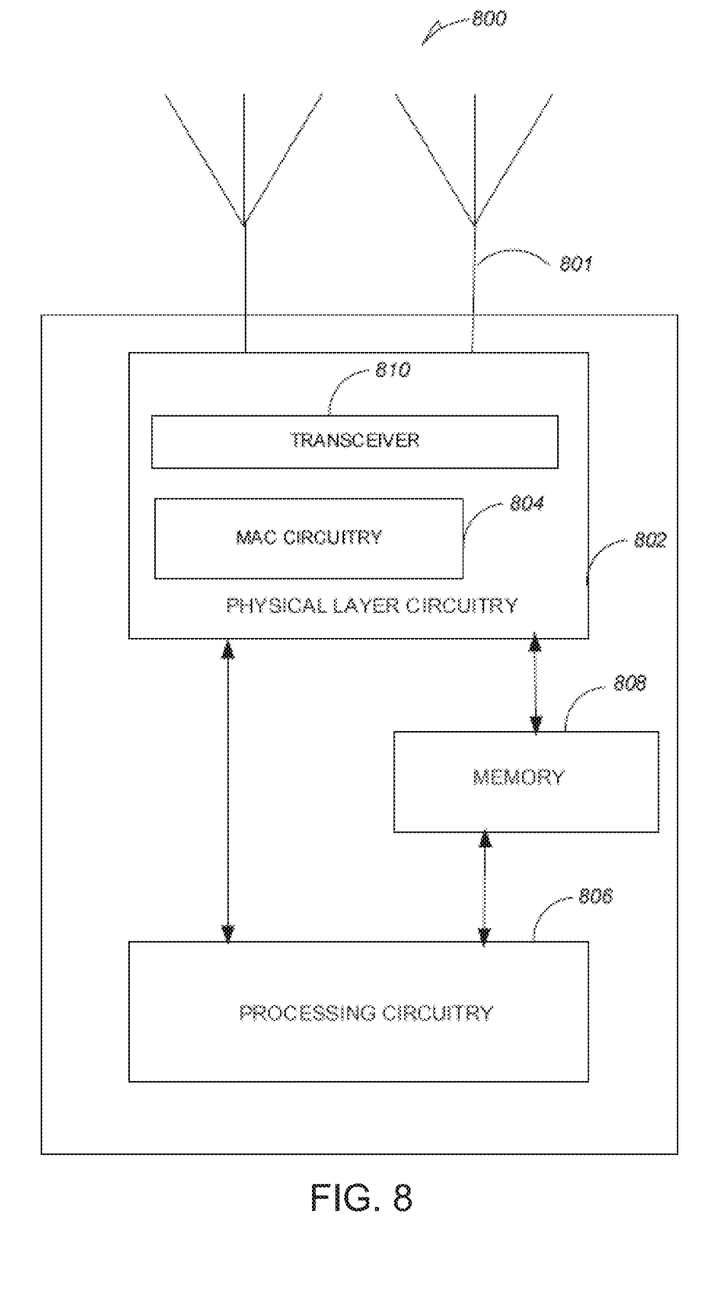
FIG. 8 illustrates a functional diagram of an example communication station or example access point, according to one or more example embodiments of the disclosure.

FIG. 8 shows a functional diagram of an exemplary communication station 800 in accordance with some embodiments. In one embodiment, FIG. 8 illustrates a functional block diagram of a communication station that may be suitable for use as an AP 102 (FIG. 1) or communication station STA 104 (FIG. 1) in accordance with some embodiments. The communication station 800 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 800 may include physical layer circuitry 802 having a transceiver 810 for transmitting and receiving signals to and from other communication stations using one or more antennas 801. The physical layer circuitry 802 may also include medium access control (MAC) circuitry 804 for controlling access to the wireless medium. The communication station 800 may also include processing circuitry 806 and memory 808 arranged to perform the operations described herein. In some embodiments, the physical layer circuitry 802 and the processing circuitry 806 may be configured to perform operations detailed in FIGS. 2-7.

In accordance with some embodiments, the MAC circuitry 804 may be arranged to contend for a wireless medium and configure frames or packets for communicating over the wireless medium and the physical layer circuitry 802 may be arranged to transmit and receive signals. The physical layer circuitry 802 may include circuitry for modulation/demodulation, upconversion/downconversion, filtering, amplification, etc. In some embodiments, the processing circuitry 806 of the communication station 800 may include one or more processors. In other embodiments, two or more antennas 801 may be coupled to the physical layer circuitry 802 arranged for sending and receiving signals. The memory 808 may store information for configuring the processing circuitry 806 to perform operations for configuring and transmitting message frames and performing the various operations described herein. The memory 808 may include any type of memory, including non-transitory memory, for storing information in a form readable by a machine (e.g., a computer). For example, the memory 808 may include a computer-readable storage device may, read-only memory (ROM), random-access memory (RAM), magnetic disk storage media, optical storage media, flash-memory devices and other storage devices and media.

In some embodiments, the communication station 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 800 may include one or more antennas 801. The antennas 801 may include one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 800 may include one or more of a keyboard, a display, a non-volatile memory port, multiple antennas, a graphics processor, an application processor, speakers, and other mobile device elements. The display may be an LCD screen including a touch screen.

Although the communication station 800 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 800 may refer to one or more processes operating on one or more processing elements.

Certain embodiments may be implemented in one or a combination of hardware, firmware and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 800 may include one or more processors and may be configured with instructions stored on a computer-readable storage device memory.

Figure 9:
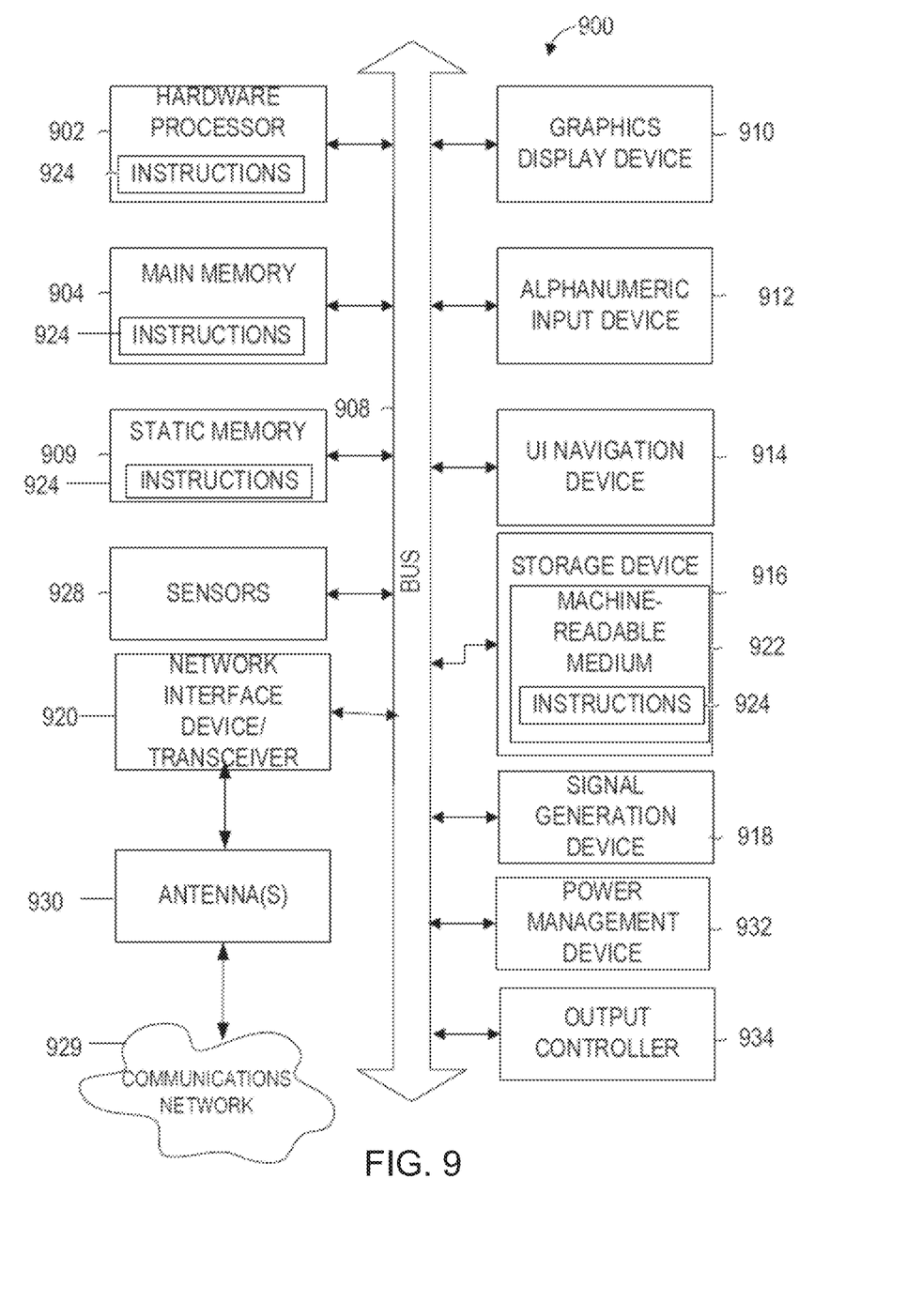
FIG. 9 shows a block diagram of an example of a machine upon which any of one or more techniques (e.g., methods) according to one or more embodiments of the disclosure discussed herein may be performed.

FIG. 9 illustrates a block diagram of an example of a machine 900 or system upon which any one or more of the techniques (e.g., methodologies) discussed herein may be performed. In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912 and UI navigation device 914 may be a touch screen display. The machine 900 may additionally include a storage device (i.e., drive unit) 916, a signal generation device 918 (e.g., a speaker), a network interface device/transceiver 920 coupled to antenna(s) 930, and one or more sensors 928, such as a global positioning system (GPS) sensor, compass, accelerometer, or other sensor. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium includes a machine readable medium with a plurality of particles having resting mass. Specific examples of massed machine readable media may include: non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible media to facilitate communication of such software.

Example Embodiments

One example embodiment is a method for extending range of a Wi-Fi network. The method may include the operations of appending, by a network device, one or more codebits to one or more original codebits or coded symbols, sending, by the network device, the original codebits or coded symbols and the appended codebits to an interleaver or a constellation mapper for transmission. The original codebits or coded symbols and the appended codebits may be sent over a plurality of subcarriers, for example.

Another example embodiment is a device for extending range of a Wi-Fi network, the device can include physical layer circuitry, one or more antennas, at least one memory, and one or more processing elements to append one or more codebits to one or more original codebits or coded symbols, send the original codebits or coded symbols and the appended codebits to an interleaver and a constellation mapper for transmission. The original codebits or coded symbols and the appended codebits are sent over a plurality of subcarriers.

Another example embodiment is a non-transitory computer readable storage device including instructions stored thereon, which when executed by one or more processor(s) of a network device, cause the network device to perform operations of appending, by a network device, one or more codebits to one or more original codebits or coded symbols, sending, by the network device, the original codebits or coded symbols and the appended codebits to an interleaver or a constellation mapper for transmission. The original codebits or coded symbols and the appended codebits are sent over a plurality of subcarriers.

While there have been shown, described and pointed out, fundamental novel features of the disclosure as applied to the exemplary embodiments thereof, it will be understood that various omissions and substitutions and changes in the form and details of devices illustrated, and in their operation, may be made by those skilled in the art without departing from the spirit of the disclosure. Moreover, it is expressly intended that all combinations of those elements and/or method operations, which perform substantially the same function in substantially the same way to achieve the same results, are within the scope of the disclosure. Moreover, it should be recognized that structures and/or elements and/or method operations shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

What is claimed is:

1. A device for encoding one or more high-efficiency (HE) signal fields associated with a multi-user multiple-input multiple-output (MU-MIMO) communication, the device comprising:
   at least one memory that stores computer-executable instructions; and
   at least one processor configured to access the at least one memory, wherein the at least one processor is configured to execute the computer-executable instructions to:
   determine a first HE signal field of one or more HE signal fields of a frame associated with one or more first station devices (STAs);
   segment the first HE signal field into a common part and one or more user specific parts;
   encode a first user specific part of the one or more user specific parts individually into one or more first symbols;
   encode a second user specific part of the one or more user specific parts individually into one or more second symbols; and
   cause to send the one or more first symbols associated with the encoded first user specific part and the one or more second symbols associated with the encoded second user specific part to the one or more first STAs using a first subcarrier of one or more subcarriers, wherein the first HE signal field comprises the encoded first user specific part and the encoded second user specific part.

2. The device of claim 1, wherein the first user specific part is associated with a first group of STAs and the second user specific part is associated with a second group of STAs.

3. The device of claim 2, wherein the first group of STAs is comprised of two STAs.

4. The device of claim 1, wherein the encoded first user specific part comprises first tail bits, and wherein the encoded second user specific part comprises second tail bits.

5. The device of claim 1, wherein the one or more subcarriers are associated with at least one of a 20 MHz frequency channel, a 40 MHz frequency channel, an 80 MHz frequency channel, or 160 MHz frequency channel.

6. The device of claim 1, wherein the first subcarrier is associated with a 20 MHz frequency channel.

7. The device of claim 1, wherein the memory and the processing circuitry are further configured to:
determine a second HE signal field of the one or more HE signal fields based on the one or more subcarriers being associated with 40 MHz, 80 MHz, or 160 MHz; and
cause to send the second HE signal field to one or more second STAs using a second subcarrier of the one or more subcarriers.

8. The device of claim 1, wherein the memory and the processing circuitry are further configured to:
determine a duplicate HE signal field of the first HE signal field based on the one or more subcarriers being associated with 80 MHz, or 160 MHz; and
cause to send the duplicate HE signal field on a third subcarrier of the one or more subcarriers.

9. The device of claim 1, further comprising a transceiver configured to transmit and receive wireless signals.

10. The device of claim 9, further comprising an antenna coupled to the transceiver.

11. A non-transitory computer-readable medium storing computer-executable instructions which when executed by one or more processors result in performing operations comprising:
determining a first HE signal field of one or more HE signal fields of a frame associated with one or more first station devices (STAs);
segmenting the first HE signal field into a common part and one or more user specific parts;
encoding a first user specific part of the one or more user specific parts individually into one or more first symbols;
encoding a second user specific part of the one or more user specific parts individually into one or more second symbols; and
causing to send the one or more first symbols associated with the encoded first user specific part and the one or more second symbols associated with the encoded second user specific part to the one or more first STAs using a first subcarrier of one or more subcarriers, wherein the first HE signal field comprises the encoded first user specific part and the encoded second user specific part.

12. The non-transitory computer-readable medium of claim 11, wherein the first user specific part is associated with a first group of STAs and the second user specific part is associated with a second group of STAs.

13. The non-transitory computer-readable medium of claim 12, wherein the first group of STAs is comprised of two STAs.

14. The non-transitory computer-readable medium of claim 11, wherein the first subcarrier is associated with a 20 MHz frequency channel.

15. A method comprising:
determining, by one or more processors, a first HE signal field of one or more HE signal fields of a frame associated with one or more first station devices (STAs);
segment the first HE signal field into a common part and one or more user specific parts;
encoding a first user specific part of the one or more user specific parts individually into one or more first symbols;
encoding a second user specific part of the one or more user specific parts individually into one or more second symbols; and
causing to send the one or more first symbols associated with the encoded first user specific part and the one or more second symbols associated with the encoded second user specific part to the one or more first STAs using a first subcarrier of one or more subcarriers, wherein the first HE signal field comprises the encoded first user specific part and the encoded second user specific part.

16. The method of claim 15, wherein the first user specific part is associated with a first group of STAs and the second user specific part is associated with a second group of STAs.

17. The method of claim 16, wherein the first group of STAs is comprised of two STAs.

18. The method of claim 15, wherein the encoded first user specific part comprises first tail bits, and wherein the encoded second user specific part comprises second tail bits.

19. The method of claim 15, wherein the one or more subcarriers are associated with at least one of a 20 MHz frequency channel, a 40 MHz frequency channel, an 80 MHz frequency channel, or 160 MHz frequency channel.

20. The method of claim 15, wherein the first subcarrier is associated with a 20 MHz frequency channel.

* * * * *